United States Patent
Kobayashi

(10) Patent No.: US 9,544,410 B2
(45) Date of Patent: Jan. 10, 2017

(54) INFORMATION DISPLAY APPARATUS AND INFORMATION DISPLAY METHOD

(71) Applicant: Clarion Co., Ltd., Chuo-ku, Saitama-shi, Saitama (JP)

(72) Inventor: Yuuta Kobayashi, Saitama (JP)

(73) Assignee: Clarion Co., Ltd., Saitama-shi (JP)

(*) Notice: Subject to any disclaimer, the term of this patent is extended or adjusted under 35 U.S.C. 154(b) by 0 days.

(21) Appl. No.: 14/242,468

(22) Filed: Apr. 1, 2014

(65) Prior Publication Data

US 2014/0295803 A1    Oct. 2, 2014

(30) Foreign Application Priority Data

Apr. 2, 2013   (JP) ................. 2013-076692

(51) Int. Cl.
   *H04W 4/12*    (2009.01)
   *H04M 1/60*   (2006.01)
   *G06Q 10/10*  (2012.01)
   *H04L 12/58*  (2006.01)

(52) U.S. Cl.
   CPC ......... *H04M 1/6075* (2013.01); *G06Q 10/107* (2013.01); *H04L 51/24* (2013.01); *H04W 4/12* (2013.01); *H04L 51/38* (2013.01)

(58) Field of Classification Search
   CPC .... H04M 1/6075; H04L 12/58; G06Q 10/107; H04W 4/12
   See application file for complete search history.

(56) References Cited

U.S. PATENT DOCUMENTS

| 2003/0060232 | A1  | 3/2003  | Hashimoto et al. |
| 2004/0254715 | A1* | 12/2004 | Yamada ................ G01C 21/26 701/117 |
| 2005/0231529 | A1  | 10/2005 | Skwarek et al. |
| 2006/0052086 | A1  | 3/2006  | Funato |
| 2008/0147321 | A1* | 6/2008  | Howard ............... G01C 21/367 701/431 |

(Continued)

FOREIGN PATENT DOCUMENTS

| CN | 1411155 A   | 4/2003 |
| CN | 1747395 A   | 3/2006 |
| JP | 2005-1533 A | 1/2005 |

OTHER PUBLICATIONS

Extended European Search Report dated Jun. 30, 2014 (six (6) pages).

(Continued)

*Primary Examiner* — Chuong A Ngo
(74) *Attorney, Agent, or Firm* — Crowell & Moring LLP

(57) ABSTRACT

The information display part displays screen information for notifying the user that the electronic mail has been received when the portable terminal device has received the electronic mail while first screen information is displayed, in addition to the first screen information or instead of the first screen information, and continues to display second screen information when the portable terminal device has received the electronic mail while the second screen information is displayed, without displaying the screen information for notifying the user that the electronic mail has been received, and displays the screen information for notifying the user that electronic mail has been received after display of the second screen information is finished.

14 Claims, 7 Drawing Sheets

(56) References Cited

U.S. PATENT DOCUMENTS

| | | | |
|---|---|---|---|
| 2009/0177392 A1* | 7/2009 | Komaba | G01C 21/3697 701/431 |
| 2010/0144399 A1* | 6/2010 | Abeta | G01C 21/362 455/569.2 |
| 2012/0050028 A1* | 3/2012 | Mastronardi | B60K 37/00 340/441 |
| 2012/0150977 A1 | 6/2012 | Sakata et al. | |
| 2012/0302206 A1 | 11/2012 | Vock et al. | |

OTHER PUBLICATIONS

Chinese-language Office Action issued in counterpart Chinese Application No. 201410132175.8 dated Jul. 28, 2016 with English translation (Eleven (11) pages).

* cited by examiner

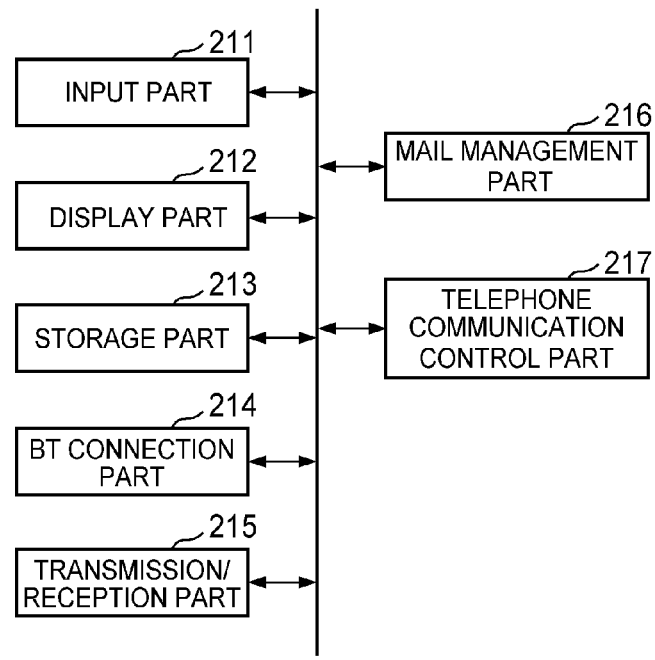

INFORMATION DISPLAY APPARATUS AND INFORMATION DISPLAY METHOD

BACKGROUND OF THE INVENTION

The present invention relates to an information display apparatus and an information display method.

In Japanese Patent Laid-open Publication No. 2005-1533, there is described as an object of the invention that "In a car navigation device 1, a risk when a driver is notified of email incoming can be decreased" and is described as solution means of the invention that "In the car navigation device 1 configured to notify a driver of email incoming, information relating to a traveling speed of the vehicle is retrieved (Step 315), and, based on the retrieved information, when the traveling speed of the vehicle is greater than a predetermined speed, notifying the driver of email incoming is prohibited (Step 320)".

In Japanese Patent Laid-open Publication No. 2005-1533, because a predetermined screen is displayed on a display apparatus when the vehicle is stopped, the user can know that electronic mail has been received by viewing the predetermined screen. However, for example, when the vehicle approaches an intersection, the display apparatus may display a screen indicating a direction to travel. When the display apparatus displays the screen informing that electronic mail has been received even in this case, it is not always preferred because the user cannot check or can hardly check the screen indicating a direction for the vehicle to travel. In other words, priority of information for the user changes in accordance with a situation where the user is placed, but this point is not considered in Japanese Patent Laid-open Publication No. 2005-1533.

SUMMARY OF THE INVENTION

In view of this, it is an object of the present invention to provide an information display apparatus and an information display method that can inform the user at an appropriate timing that electronic mail has been received.

In order to solve the problem described above, according to one embodiment of the present invention, there is provided an information display apparatus, including: an information display part, which displays various information; and a communication part, which performs one of wireless communication and wired communication to/from a portable terminal device, in which the information display part is configured to: display screen information for notifying a user that electronic mail has been received when the portable terminal device has received the electronic mail while first screen information is displayed, one of in addition to the first screen information and instead of the first screen information; and continue to display second screen information when the portable terminal device has received the electronic mail while the second screen information is displayed, without displaying the screen information for notifying the user that the electronic mail has been received, and display the screen information for notifying the user that the electronic mail has been received after display of the second screen information is finished.

According to one embodiment of the present invention, it is possible to inform the user at an appropriate timing that electronic mail has been received.

BRIEF DESCRIPTION OF THE DRAWINGS

FIG. 5 is a diagram illustrating a functional block of the portable terminal device according to an embodiment of the present invention.

FIG. 6 is a diagram illustrating mail reception notification restriction information according to an embodiment of the present invention.

DESCRIPTION OF THE PREFERRED EMBODIMENTS

Now, exemplary embodiments of the present invention are described with reference to the drawings.

Figure 1:
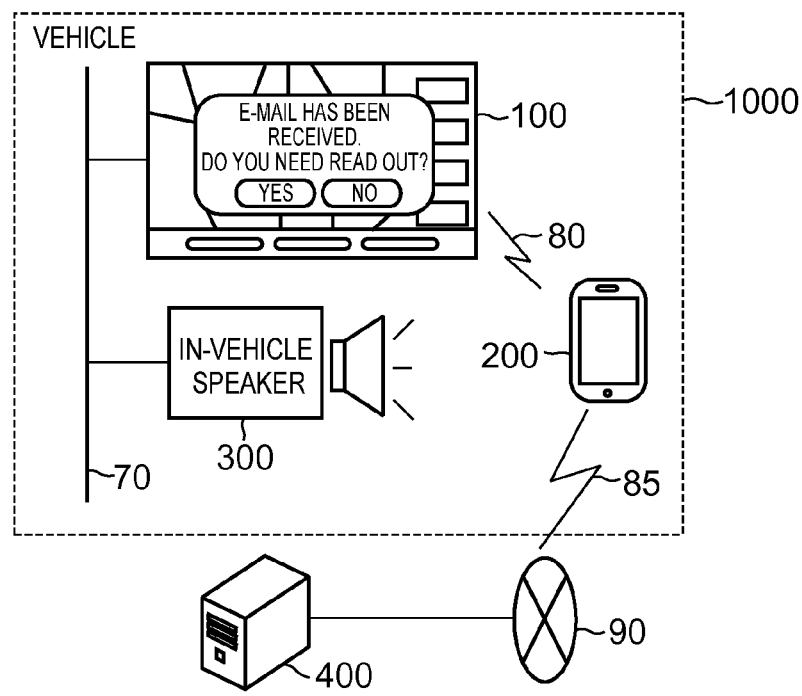
FIG. 1 is a diagram illustrating a schematic configuration of an in-vehicle system according to an embodiment of the present invention.

FIG. 1 is a diagram illustrating an example of a schematic configuration of an in-vehicle system 1000 according to a first embodiment of the present invention. The in-vehicle system 1000 includes a navigation apparatus 100 and a portable terminal device 200. The navigation apparatus 100 is an information display apparatus having a so-called navigation function such as route search, route guidance, and traffic information provision. In addition, the portable terminal device 200 is a portable information processing terminal such as a smart phone, a cellular phone, or a personal digital assistant (PDA).

The navigation apparatus 100 is connected to an in-vehicle speaker 300 and various devices mounted in the vehicle via an in-vehicle network (for example, a controller area network (CAN)) 70, so as to communicate with these devices. In addition, the navigation apparatus 100 communicates with the portable terminal device 200 by short distance wireless communication 80 using Bluetooth (registered trademark), for example.

In addition, the navigation apparatus 100 provides a hands-free function to the portable terminal device 200 connected in a communicable manner via Bluetooth. Further, the navigation apparatus 100 outputs information on voice of the person on the other end acquired from the portable terminal device 200 by the hands-free function from the in-vehicle speaker 300 via the CAN 70.

In addition, when the portable terminal device 200 connected in a communicable manner via Bluetooth receives electronic mail, the navigation apparatus 100 displays the reception notification on a display.

The portable terminal device 200 transmits and receives electronic mail to and from a mail server 400 using wireless communication 85 via a network 90 such as the Internet. In addition, the portable terminal device 200 performs a predetermined communication to/from the navigation apparatus 100 connected via Bluetooth.

[Hardware Configuration of Navigation Apparatus 100]

Figure 2:
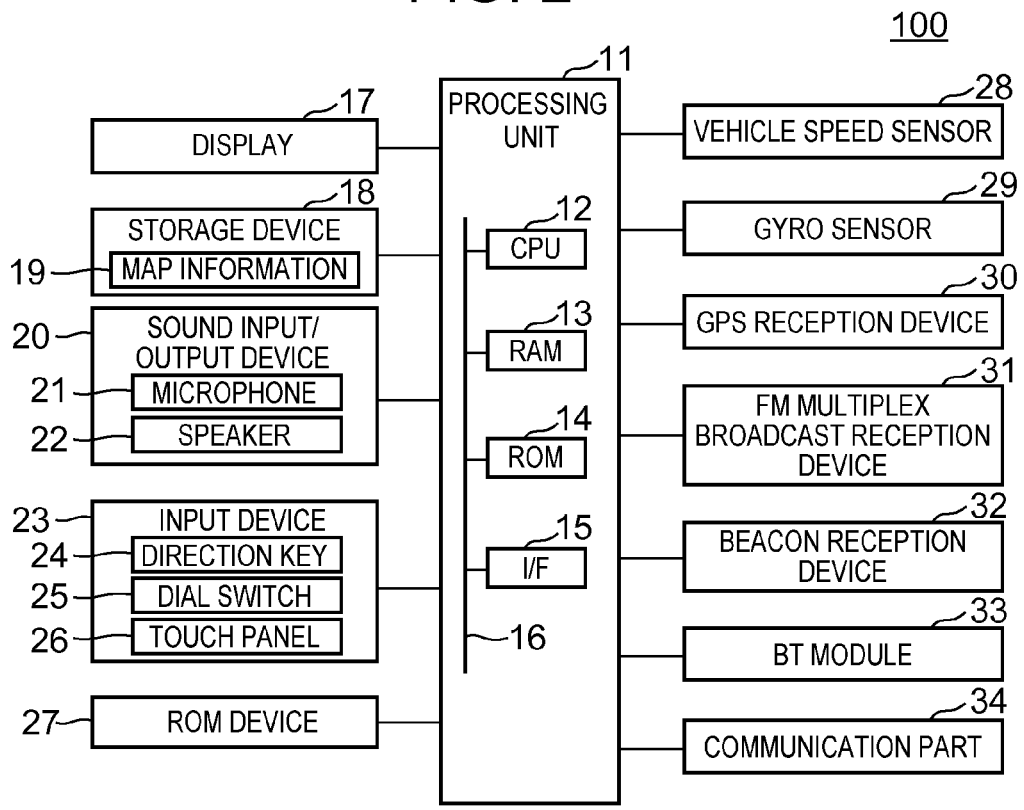
FIG. 2 is a diagram illustrating a hardware configuration of a navigation apparatus according to an embodiment of the present invention.

FIG. 2 is a diagram illustrating an example of a hardware configuration of the navigation apparatus 100. The navigation apparatus 100 includes a processing unit 11, a display 17, a storage device 18, a sound input/output device 20 (including a microphone 21 as a sound input device and a speaker 22 as a sound output device), an input device 23, a ROM device 27, a vehicle speed sensor 28, a gyro sensor 29, a global positioning system (GPS) reception device 30, an FM multiplex broadcast reception device 31, a beacon reception device 32, a BT module 33, and a communication part 34.

As illustrated in FIG. 2, the processing unit 11 has a configuration, in which individual devices are connected with each other via a bus 16. The processing unit 11 includes a central processing unit (CPU) 12 for executing various processes such as numeric operation and control of the devices, a random access memory (RAM) 13 for storing map information 19 read out from the storage device 18, a result of operation, and the like, a read only memory (ROM) 14 for storing programs and data, and an interface (I/F) 15 for connecting various hardware with the processing unit 11.

The processing unit 11 is a core unit for performing various processes. The processing unit 11 detects current position, for example, based on information output from various sensors, the GPS reception device 30, the FM multiplex broadcast reception device 31, and the like. In addition, the processing unit 11 reads out the map information 19 necessary for a display from the storage device 18 or the ROM device 27 based on the obtained current position information. In addition, the processing unit 11 performs graphics expansion of the read map information 19, on which a mark indicating the current position is superimposed, and outputs a signal for display on the display 17.

In addition, the processing unit 11 uses the map information 19 and the like stored in the storage device 18 or the ROM device 27 so as to search for routes from a start position (or the current position) to a destination, and to specify a recommended route. In addition, the processing unit 11 outputs a predetermined signal to the in-vehicle speaker 300 and the display 17 for route guidance. More specifically, for example, the processing unit 11 determines whether or not the current position is within a predetermined distance (for example, 100 m to 200 m) to an intersection to turn right or left (hereinafter referred to as a right/left turning intersection) based on the recommended route. When the current position is within the predetermined distance to the right/left turning intersection, the processing unit 11 outputs to the display 17 screen information indicating a direction for the vehicle to travel and an enlarged map of the intersection (hereinafter referred to as "enlarged intersection screen") together with or instead of the screen information indicating a map around the current position. Further, when the vehicle passes the right/left turning intersection, the processing unit 11 finishes the display of the enlarged intersection screen. In this way, the processing unit 11 executes a predetermined guidance such as the display of the enlarged screen information and output of sound when the vehicle approaches a predetermined point that needs a guidance.

The display 17 is a unit for displaying the screen information, and includes a liquid crystal display, an organic EL display, or the like.

The storage device 18 includes a storage medium, which is capable of at least reading and writing, such as a hard disk drive (HDD) or a nonvolatile memory card. The storage device 18 stores the map information 19 and the like, for example.

The sound input/output device 20 includes the microphone 21 as the sound input device and the speaker 22 as the sound output device. The microphone 21 obtains sound such as user's voice outside the navigation apparatus 100. The speaker 22 outputs predetermined voice information.

The input device 23 is a device for receiving an instruction from the user. The input device 23 includes a direction key 24, a dial switch 25, a touch panel 26, and other hardware switches (not shown). For instance, the input device 23 receives an instruction concerning a destination desired by the user.

The ROM device 27 includes a storage medium, which is capable at least reading, such as a ROM including a CD-ROM and a DVD-ROM, or an integrated circuit (IC) card. The storage medium stores moving image information, voice information, and the like, for example.

The vehicle speed sensor 28, the gyro sensor 29, and the GPS reception device 30 are used for detecting the current position by the navigation apparatus 100. The vehicle speed sensor 28 is a sensor that outputs a value used for calculating vehicle speed. The gyro sensor 29 includes an optical fiber gyro, an oscillation gyro, or the like, and detects angular velocity due to rotation of a moving body. The GPS reception device 30 receives signals from GPS satellites and measures a distance between the moving body and the GPS satellite as well as a rate of change of the distance for three or more satellites, so as to measure the current position of the moving body, traveling speed thereof, and traveling direction thereof.

The FM multiplex broadcast reception device 31 receives FM multiplex broadcast signals transmitted from FM broadcast stations. As the FM multiplex broadcasts, there are general current traffic information, restriction information, service area/parking area (SA/PA) information, parking lot information, and weather information, such as vehicle information communication system (VICS, registered trademark) information, and text information provided by radio stations as FM multiplex general information.

The beacon reception device 32 receives the general current traffic information, the restriction information, the service area/parking area (SA/PA) information, the parking lot information, and the weather information, such as the VICS information, emergency warning, and the like. For instance, the beacon reception device 32 is a reception device such as an optical beacon for communicating by light, a radio wave beacon for communicating by radio wave, or the like.

The BT module 33 is a module for performing short distance wireless communication via Bluetooth. The BT module 33 has a wireless communication antenna mounted thereon and has profiles for realizing predetermined functions such as a hands-free function, an audio reproduction function, and the like mounted thereon.

The communication part 34 is a device for performing a predetermined communication to/from external devices (for example, a server or the like) via a network. In addition, the communication part 34 performs various information communication to/from individual devices mounted in the vehicle via the CAN 70, for example. Further, as the devices mounted in the vehicle, there are the in-vehicle speaker 300 that outputs sounds in the vehicle, an in-vehicle camera (not shown) capable of taking images around the vehicle (for example, rear view of the vehicle), and the like. The communication part 34 is capable of transmitting a sound signal to the in-vehicle speaker 300, and receiving an image signal showing the image taken by the in-vehicle camera. Further, the navigation apparatus 100 may receive the image signal from the in-vehicle camera without using the CAN 70.

[Hardware Configuration of Portable Terminal Device 200]

Figure 3:
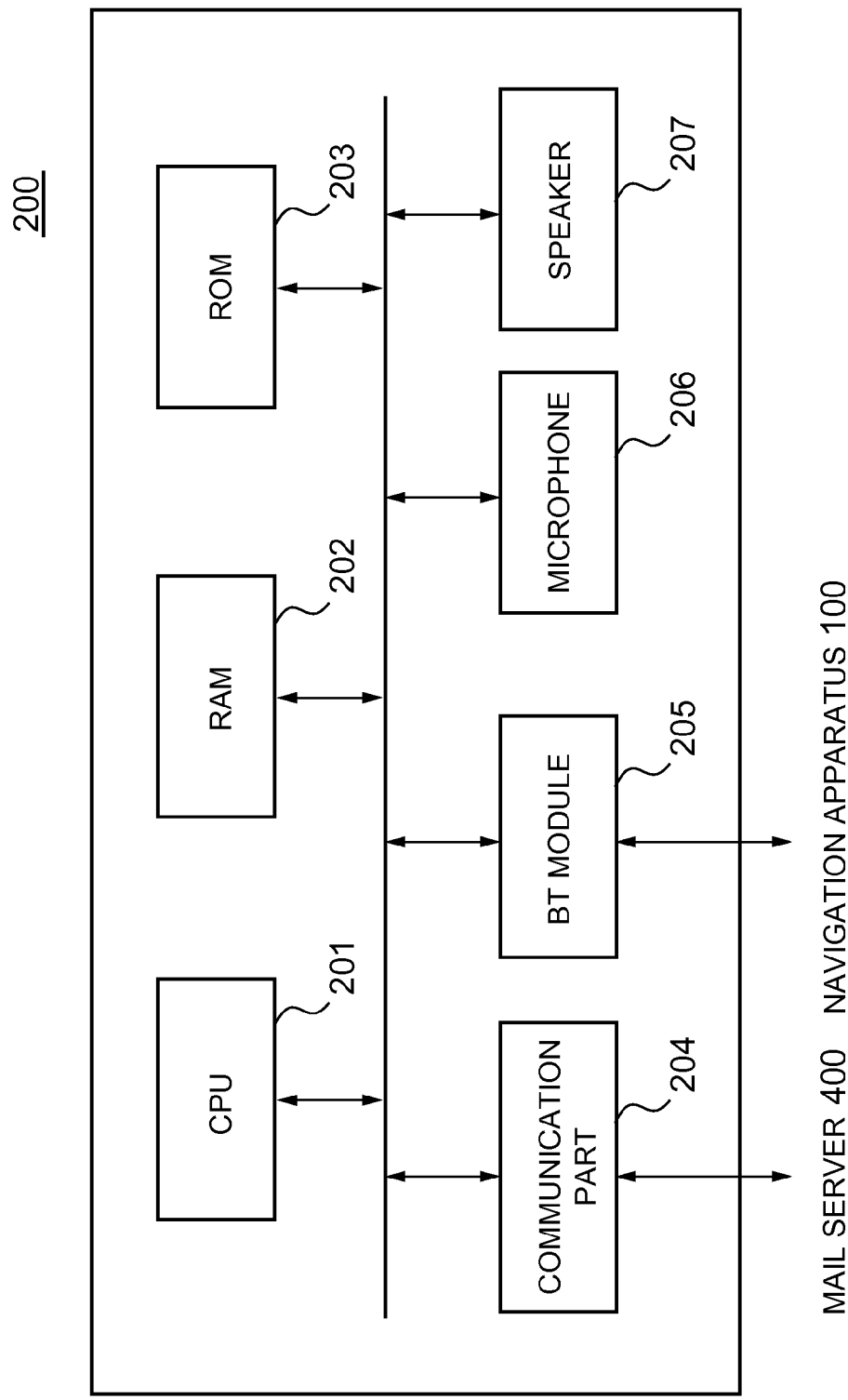
FIG. 3 is a diagram illustrating a hardware configuration of a portable terminal device according to an embodiment of the present invention.

FIG. 3 is a diagram illustrating an example of a hardware configuration of the portable terminal device 200. As illustrated in FIG. 3, the portable terminal device 200 includes a CPU 201 as a processing unit, memories such as a RAM 202 and a ROM 203, a communication part 204 for communicating with other devices (for example, the mail server 400 and the like) via the network 90, a BT module 205 for performing short distance wireless communication to/from the navigation apparatus 100 via Bluetooth, a microphone 206 for acquiring caller's voice, and a speaker 207 for outputting voice of a person on the other end. Further, because the BT module 205 has the same function as that in the navigation apparatus 100, description thereof is omitted.

[Functional Block of Navigation Apparatus 100]

Figure 4:
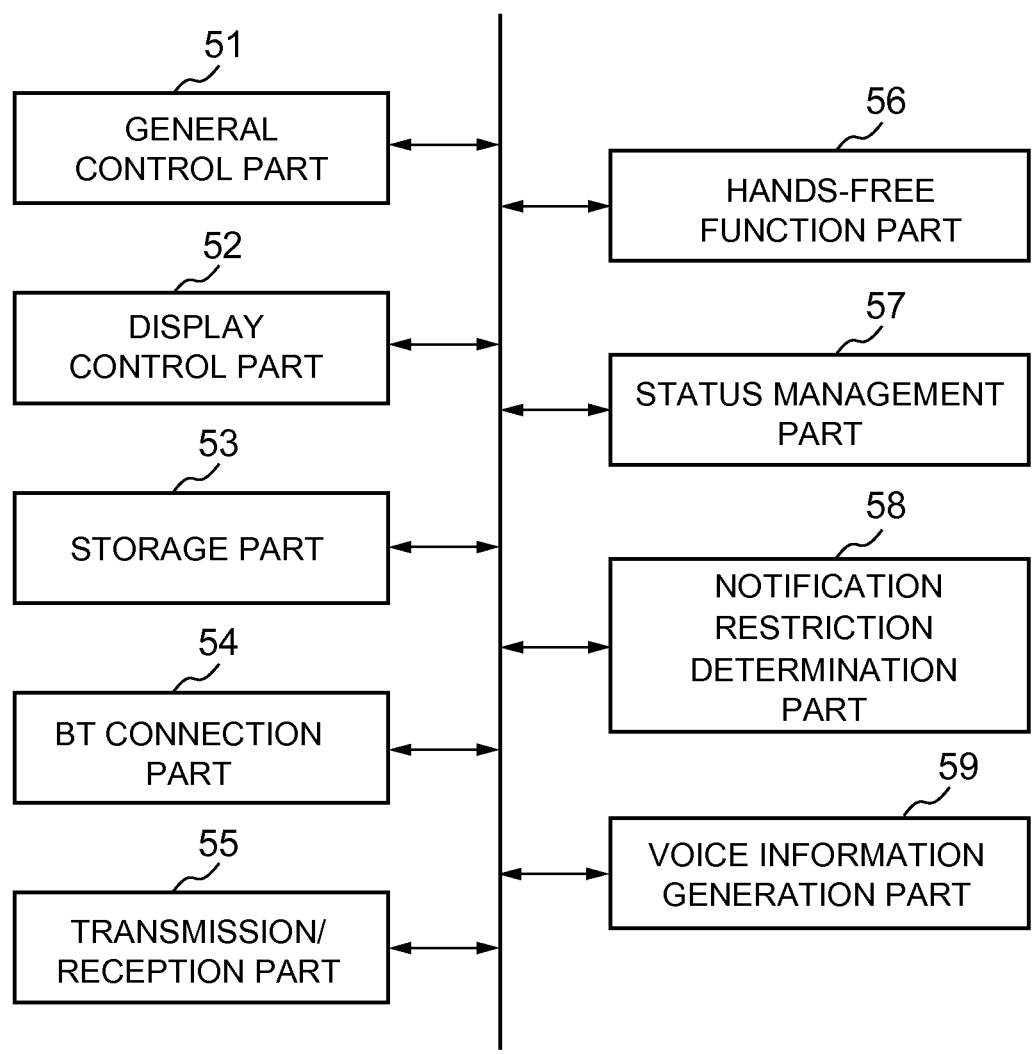
FIG. 4 is a diagram illustrating a functional block of the navigation apparatus according to an embodiment of the present invention.

FIG. 4 is a diagram illustrating an example of a functional block of the navigation apparatus 100. The navigation apparatus 100 includes a general control part 51, a display control part 52, a storage part 53, a BT connection part 54, a transmission/reception part 55, a hands-free function part 56, a status management part 57, a notification restriction determination part 58, and a voice information generation part 59.

The general control part 51 is a core functional part for controlling the entire function of the navigation apparatus 100. Specifically, the general control part 51 receives a user's input instruction via the microphone 21, the touch panel 26, and the dial switch 25 of the navigation apparatus 100, and outputs an execution instruction to a predetermined functional part. In addition, the general control part 51 imparts information acquired from other devices (for example, the storage device 18, the sound input/output device 20, and the like) embedded in the navigation apparatus 100, sensors (for example, the vehicle speed sensor 28, the gyro sensor 29, and the like), and external devices (for example, the portable terminal device 200) to the other devices, the sensors, and the functional parts.

The display control part 52 is a functional part for controlling screens to be displayed on the display 17 of the navigation apparatus 100. Specifically, the display control part 52 acquires screen information of a menu screen, a map screen, an audio screen, and the like, requested in accordance with a process in the navigation apparatus 100 from the storage part 53 so as to display the screen on the display 17. In addition, the display control part 52 displays an image screen taken by the in-vehicle camera on the display 17 in accordance with an instruction from the general control part 51. Further, the display control part 52 distinguishes a screen category of the image screen as a "camera image screen". The "camera image screen" is also an example of the screen information. The screen category is described later.

In addition, the display control part 52 displays on the display 17 a pop-up dialog, which includes a message notifying that the portable terminal device 200 has received electronic mail, for receiving from the user an instruction of whether or not to read out the text of the electronic mail, in accordance with an instruction from the notification restriction determination part 58.

Further, when the display control part 52 displays the pop-up dialog on the display 17, the general control part 51 acquires voice information of the message included in the dialog from the storage part 53 and outputs the voice information to the in-vehicle speaker 300.

The storage part 53 is a functional part for storing predetermined information. Specifically, the storage part 53 stores information necessary for realizing the navigation function such as the map information 19 including information about linkages constituting roads on the map, traffic information, route information, and section information. In addition, the storage part 53 stores mail reception notification restriction information 600, screen information 700, and status information 800. In addition, the storage part 53 stores in advance voice information of messages included in pop-up dialogs.

The mail reception notification restriction information 600 is information including a table defining whether or not to permit the display of the pop-up dialog depending on a situation. FIG. 6 is a diagram illustrating an example of the mail reception notification restriction information 600. The mail reception notification restriction information 600 defines whether or not to permit the display of the pop-up dialog in each of the cases of a "telephone communication state of the navigation apparatus" 601 and a "screen category of the navigation apparatus" 602.

Further, the mail reception notification restriction information 600 illustrated in FIG. 6 defines not only the telephone communication state and the screen category, in which the display of the pop-up dialog is caused to wait, but also the telephone communication state and the screen category, in which the display of the dialog is permitted. However, this is for describing this embodiment in an easy-to-understand manner, and in reality it is sufficient to define only the telephone communication state and the screen category, in which the display of the pop-up dialog is caused to wait.

Specifically, in the mail reception notification restriction information 600, there are registered predetermined telephone communication states and screen categories, in which the display of the pop-up dialog is permitted, and predetermined telephone communication states and screen categories, in which the display of the dialog is caused to wait, for each of the "telephone communication state of the navigation apparatus" 601 and the "screen category of the navigation apparatus" 602.

Specifically, the mail reception notification restriction information 600 defines wait of the display of the pop-up dialog in the case where the navigation apparatus 100 is in a predetermined telephone communication state such as "during incoming call", "during outgoing call", "during telephone communication", or "during hold on".

On the other hand, when the telephone communication state of the navigation apparatus 100 is, for example, a telephone communication state (for example, "standby") other than the predetermined telephone communication state registered to "wait", the display of the pop-up dialog is permitted.

In addition, the mail reception notification restriction information 600 defines the wait of the display of the pop-up dialog in the case where the "screen category of the navigation apparatus" 602 is any one of the "camera image screen", a "telephone communication screen", and the "enlarged intersection screen".

In addition, when the screen category of the navigation apparatus 100 is any one of the "map screen", the "audio screen", and the "menu screen", the display of the pop-up dialog is permitted.

Figure 7:
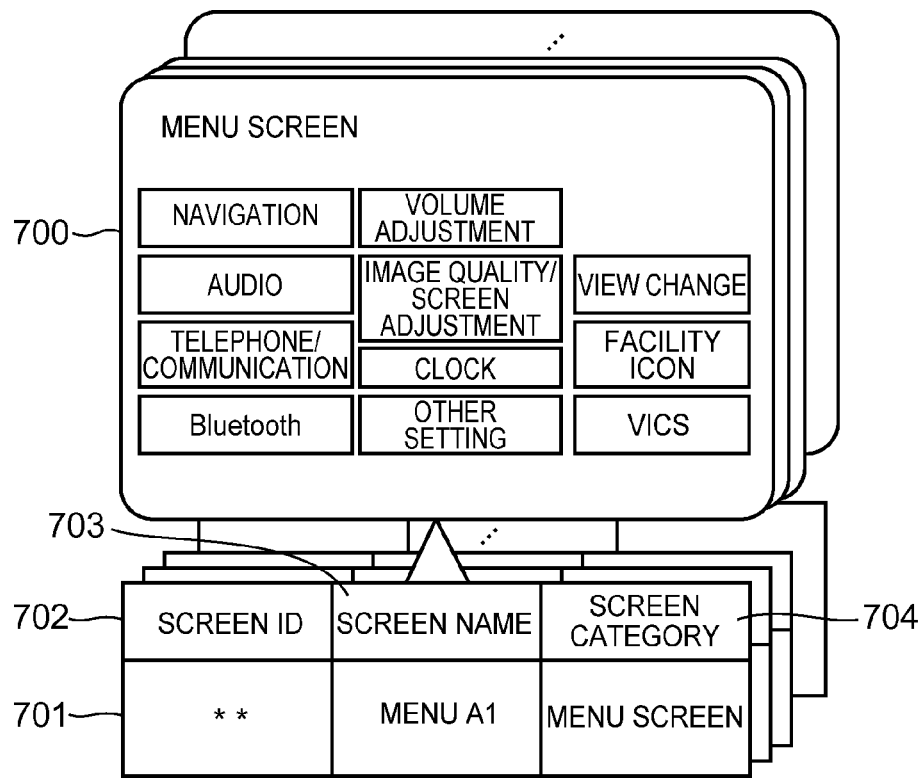
FIG. 7 is a diagram illustrating screen information according to an embodiment of the present invention.

The screen information 700 is information displayed on the display 17 of the navigation apparatus 100. FIG. 7 is a diagram illustrating an example of the screen information 700. In addition, identification information 701 for identifying the screen information 700 is added to the screen information 700. The identification information 701 includes a screen ID 702, a screen name 703, and a screen category 704. The screen ID 702 is information for identifying the screen information 700. The screen name 703 is name information for specifying screen information (for example, menu A1 and the like). The screen category 704 is information for specifying a category, to which the screen information belongs. Examples of the screen category 704 include the "menu screen", the "map screen", the "audio screen", the "telephone communication screen", the "enlarged intersection screen", and the like. Further, in the screen category 704, there is registered text information in common with the text information that can be defined in each status of the mail reception notification restriction information 600.

In this way, by classifying the screen information 700 in accordance with types and functions thereof, it is possible to eliminate work for defining all the screen information about whether the display of the pop-up dialog is permitted or is caused to wait, and hence efficiency of development can be improved. Further, a plurality of pieces of screen information can be displayed on the display 17 using a plurality of windows. For instance, screen information belonging to the category of the map screen and screen information belonging to the enlarged intersection screen can be displayed simultaneously side by side.

Figure 8:
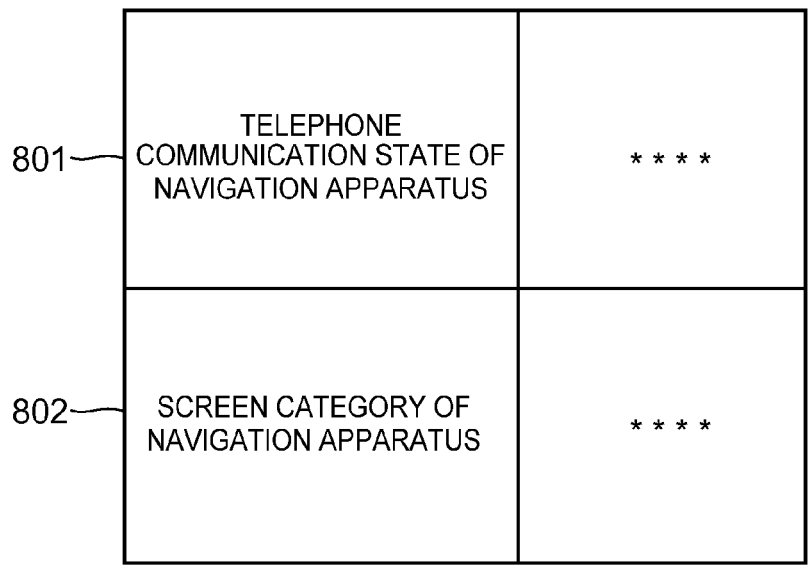
FIG. 8 is a diagram illustrating status information according to an embodiment of the present invention.

The status information 800 is information indicating a current situation of the navigation apparatus 100. Specifically, the status information 800 is information indicating a current telephone communication state of the navigation apparatus 100 and a screen category, to which the screen information of the current display belongs. FIG. 8 is a diagram illustrating an example of the status information 800. As illustrated in FIG. 8, the status information 800 includes information indicating a current situation for each of a "telephone communication state of the navigation apparatus" 801 and a "screen category of the navigation apparatus" 802. Further, when the display 17 of the navigation apparatus 100 displays a plurality of pieces of screen information, screen categories, to which individual pieces of screen information belong, are registered in the screen category 802 of the navigation apparatus. Further, the status information 800 is updated by the status management part 57 at a predetermined timing. Update of the status information 800 is described later.

FIG. 4 is referred to again for description. The BT connection part 54 is a functional part for connecting in a communicable manner via Bluetooth to the external device succeeded in pairing. Specifically, the BT connection part 54 performs pairing with the portable terminal device 200 so as to establish the short distance wireless communication 80 via Bluetooth. Further, after the short distance wireless communication 80 is established between the navigation apparatus 100 and the portable terminal device 200, the portable terminal device 200 becomes capable of transmitting mail information including a notification that electronic mail has been received and content of the e-mail (e-mail text) to the navigation apparatus 100.

The transmission/reception part 55 is a functional part for transmitting and receiving predetermined information to and from the external device connected in a communicable manner. Specifically, the transmission/reception part 55 receives information indicating the telephone communication state and the mail information from the portable terminal device 200. In addition, the transmission/reception part 55 imparts the received mail information to the notification restriction determination part 58 via the general control part 51.

The hands-free function part 56 is a functional part for realizing hands-free telephone communication in the vehicle. Specifically, the hands-free function part 56 receives voice information of a person on the other end of the telephone communication from the portable terminal device 200 succeeded in pairing of Bluetooth and outputs the voice information to the in-vehicle speaker 300. In addition, the hands-free function part 56 transmits voice information of a telephone communicator (for example, a driver or the like) acquired via the microphone 21 or the like to the portable terminal device 200. In addition, the hands-free function part 56 acquires information indicating a telephone communication state of the portable terminal device 200 from a telephone communication control part 217 of the portable terminal device 200 at a fixed interval (for example, every 0.1 seconds).

The status management part 57 is a functional part that manages the status information 800. Specifically, the status management part 57 acquires information for specifying the screen category 704 of the navigation apparatus 100 from the display control part 52 at a predetermined timing (for example, every 0.1 seconds).

In addition, the status management part 57 acquires information indicating the telephone communication state of the navigation apparatus 100 ("standby", "during incoming call", "during outgoing call", "during telephone communication", "during hold on", and the like) from the hands-free function part 56 at a predetermined timing (for example, every 0.1 seconds).

In addition, the status management part 57 updates the status information 800 based on the acquired information (information for specifying the screen category 704 of the navigation apparatus 100 and information indicating the telephone communication state of the navigation apparatus 100).

The notification restriction determination part 58 is a functional part for determining whether or not to perform the display of the pop-up dialog. Specifically, when the notification restriction determination part 58 acquires mail information from the portable terminal device 200, the notification restriction determination part 58 determines whether or not to perform the reception notification of the electronic mail by using the mail reception notification restriction information 600 and the status information 800. In addition, the notification restriction determination part 58 outputs a pop-up dialog display instruction for performing reception notification of the electronic mail to the display control part 52 in accordance with a result of the determination.

The voice information generation part 59 is a functional part that generates voice information used to read out content of the received electronic mail with voice. Specifically, the voice information generation part 59 acquires text content of the electronic mail included in the mail information acquired from the portable terminal device 200 and generates the voice information by using the text content. In addition, the voice information generation part 59 outputs the generated voice information to the in-vehicle speaker 300.

[Functional Block of Portable Terminal Device 200]

FIG. 5 is a diagram illustrating an example of a functional block of the portable terminal device 200. The portable terminal device 200 includes an input part 211, a display part 212, a storage part 213, a BT connection part 214, a transmission/reception part 215, a mail management part 216, and the telephone communication control part 217.

The input part 211 is a functional part that receives input instructions from the user via the predetermined input device 23 of the portable terminal device 200 such as a touch panel or a numeric keypad.

The display part 212 is a functional part that displays predetermined screen information on the display of the portable terminal device 200.

The storage part 213 is a functional part for storing telephone directory information such as telephone numbers and mail addresses, image information, and the like.

The BT connection part 214 is a functional part that establishes the short distance wireless communication 80 via Bluetooth with the navigation apparatus 100 succeeded in pairing.

The transmission/reception part 215 is a functional part that transmits information indicating the mail information and the information indicating the telephone communication state to the navigation apparatus 100. In addition, the transmission/reception part 215 transmits and receives electronic mail to and from the mail server 400.

The mail management part 216 is a functional part that manages electronic mail received via the transmission/reception part 215. Specifically, when electronic mail is received, the mail management part 216 generates the mail information including information for notifying the reception and the mail text content, and imparts the mail information to the transmission/reception part 215.

The telephone communication control part 217 is a functional part that controls telephone communication of the portable terminal device 200. Specifically, the telephone communication control part 217 controls the telephone communication state (such as incoming call, outgoing call, telephone communication, and hold on) in accordance with a user's instruction received via the input part 211. In addition, the telephone communication control part 217 imparts the information indicating the telephone communication state (such as "standby", "during incoming call", "during outgoing call", "during telephone communication", and "during hold on") to the hands-free function part of the navigation apparatus 100 at a fixed interval (for example, every 0.1 seconds).

The functional blocks of the navigation apparatus 100 and the portable terminal device 200 have been described.

Further, the individual functional parts of the navigation apparatus 100 and the portable terminal device 200 are constructed by the CPUs mounted in these devices executing predetermined programs after reading the programs. Therefore, programs for executing the processes of the functional parts (for example, application programs for constructing this in-vehicle system 1000) are stored in the ROM 14 and the storage device 18 of the navigation apparatus 100 and the ROM 203 of the portable terminal device 200.

In addition, the functional parts are classified contents of main processes to be executed by the CPU, in order to easily understand configurations of the navigation apparatus 100 and the portable terminal device 200 of this embodiment. Therefore, the classification method and the names of the functional parts do not limit the present invention. The configurations of the navigation apparatus 100 and the portable terminal device 200 according to this embodiment can be classified into more components depending on the contents of the processes. In addition, classification is also possible so that one component executes more processes.

In addition, the functional parts may be constructed of hardware (ASIC or the like). In addition, the process of the functional parts may be executed by a single hardware unit or by a plurality of hardware units.

In addition, the storage part 53 of the navigation apparatus 100 is realized by at least one of the RAM 13, the ROM 14, and the storage device 18, or by a combination thereof.

In addition, the transmission/reception part 55 of the navigation apparatus 100 is realized by the BT module 33 and the communication part 34.

In addition, the storage part 213 of the portable terminal device 200 is realized by at least one of the RAM 202 and the ROM 203, or by a combination thereof.

In addition, the transmission/reception part 215 of the portable terminal device 200 is realized by the communication part 204 and the BT module 205.

[Description of Operation]

Figure 9:
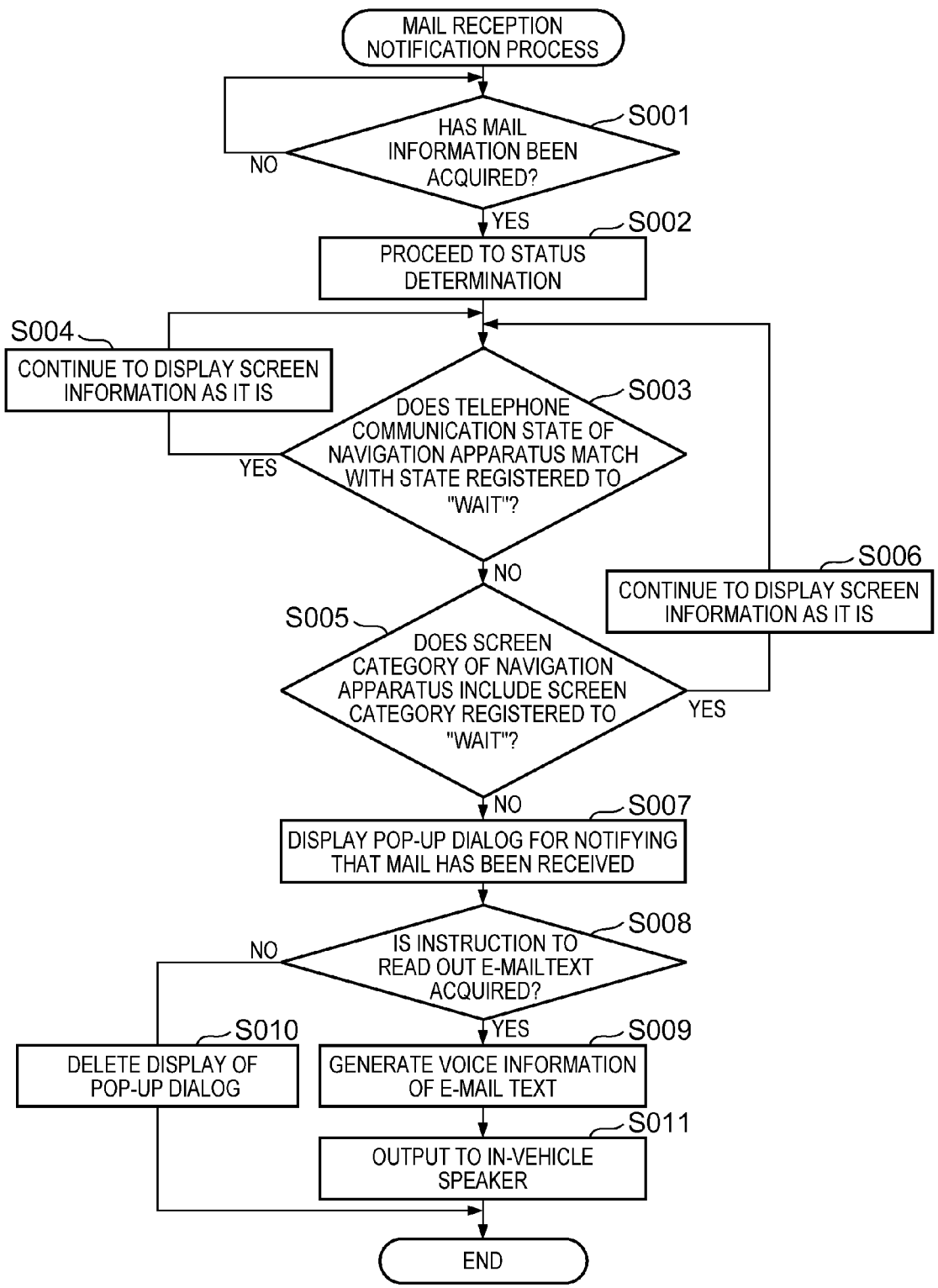
FIG. 9 is a flowchart illustrating a mail reception notification process according to an embodiment of the present invention.

Next, the mail reception notification process to be executed by the navigation apparatus 100 is described. FIG. 9 is a flowchart illustrating a flow of the mail reception notification process. This process is started when the navigation apparatus 100 is activated.

When the mail reception notification process is started, the notification restriction determination part 58 monitors whether or not the mail information has been acquired from the portable terminal device 200 via the transmission/reception part 55 (Step S001). When the mail information is acquired (Yes in Step S001), the notification restriction determination part 58 proceeds to status determination (Step S002).

In the status determination, the notification restriction determination part 58 compares the mail reception notification restriction information 600 with the status information 800 stored in the storage part 53 so as to determine a status of the navigation apparatus 100 (Step S003, Step S004). Specifically, the notification restriction determination part 58 compares the "telephone communication state of the navigation apparatus" 801 of the status information 800 with the "telephone communication state of the navigation apparatus" 601 of the mail reception notification restriction information 600. Then, when the status corresponding to the "telephone communication state of the navigation apparatus" 801 of the status information 800 matches with the telephone communication state registered in wait 604 of the mail reception notification restriction information 600 (telephone communication state defining the wait of the display of the pop-up dialog) (Yes in Step S003), the notification restriction determination part 58 repeatedly executes the process of Step S003. In addition, the display control part 52 continues to display the screen information as it is on the display 17 during the process of Step S003 (Step S004).

On the other hand, when the status corresponding to the "telephone communication state of the navigation apparatus" 801 of the status information 800 does not match with the telephone communication state registered in the wait 604 of the mail reception notification restriction information 600 (No in Step S003), the notification restriction determination part 58 proceeds to the process of Step S005.

In Step S005, the notification restriction determination part 58 compares the "screen category of the navigation apparatus" 802 of the status information 800 with the "screen category of the navigation apparatus" 602 of the mail reception notification restriction information 600. Then, when the status corresponding to the "screen category of the navigation apparatus" 802 of the status information 800 includes the screen category registered in the wait 604 of the mail reception notification restriction information 600

(screen category defining the wait of the display of the pop-up dialog) (Yes in Step S005), the notification restriction determination part 58 returns to the process of Step S003. In addition, the display control part 52 continues to display the screen information as it is on the display 17 until the process of Step S005 is finished (Step S006).

On the other hand, when the status corresponding to the "screen category of the navigation apparatus" 802 of the status information 800 does not includes any screen category registered in the wait 604 of the mail reception notification restriction information 600 (No in Step S005), the notification restriction determination part 58 proceeds to the process of Step S007.

Further, there is a case where the screen information belonging to the screen category defining the permission of the display of the pop-up dialog and the screen information belonging to the screen category defining the wait of the display of the dialog are simultaneously displayed on the display 17 of the navigation apparatus 100 (for example, the screen information whose screen category belongs to the map screen and the screen information whose screen category belongs to the enlarged intersection screen). In this case, the display of the pop-up dialog is caused to wait.

In Step S007, the display control part 52 displays the pop-up dialog for notifying that mail has been received on the display 17. Specifically, the display control part 52 displays the pop-up dialog, which includes a message notifying that the portable terminal device 200 (or the navigation apparatus 100) has received electronic mail, for receiving from the user an instruction of whether or not to read out the text of this electronic mail on the display 17 so as to be superimposed on the displayed screen information. Further, the general control part 51 acquires the voice information of the message included in the dialog from the storage part 53 and outputs the voice information to the in-vehicle speaker 300.

Next, the general control part 51 determines whether or not the read out instruction of the e-mail text is acquired (Step S008). Specifically, the general control part 51 determines whether or not an "Yes" icon out of instruction buttons (icons indicating "Yes" and "No") in the pop-up dialog is pressed via the touch panel 26.

Then, when the "Yes" icon is pressed (Yes in Step S008), the general control part 51 outputs an instruction to generate the voice information of the e-mail text content included in the mail information to the voice information generation part 59. On the other hand, when the "No" icon is pressed (No in Step S008), the general control part 51 deletes the display of the pop-up dialog (Step S010) and finishes the process of this flow.

When acquiring from the general control part 51 the instruction to generate the voice information, the voice information generation part 59 generates the voice information of the e-mail text (Step S011), outputs the voice information to the in-vehicle speaker 300 (Step S008), and finishes the process of this flow.

Figure 10:
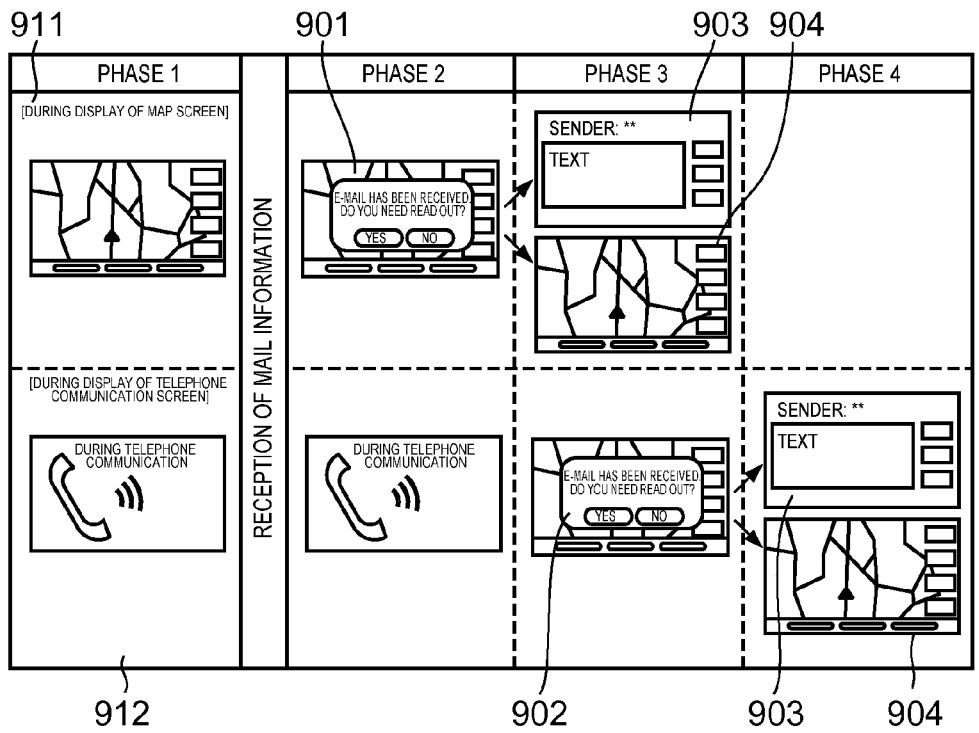
FIG. 10 is a diagram illustrating a screen example according to an embodiment of the present invention.

FIG. 10 is a diagram illustrating an example of screen transition of the navigation apparatus 100 when the mail reception notification process is executed. FIG. 10 is a diagram, in which the case where the pop-up dialog is displayed without waiting (screen transition of "during display of the map screen" 911) is compared with the case where the display of the pop-up dialog is temporarily caused to wait and then is displayed (phase transition of "during display of the telephone communication screen" 912) on the time series when the portable terminal device 200 has received electronic mail. Further, it is supposed that the status information 800 indicating the telephone communication state of the portable terminal device 200 is "standby" in the screen transition of the "during display of the map screen" 911.

[Phase 1]

In the "during display of the map screen" 911, the map screen is displayed on the display 17 of the navigation apparatus 100. On the other hand, in the "during display of the telephone communication screen" 912, the screen information during telephone communication included in the telephone communication screen category is displayed on the display 17. Further, it is supposed that, for example, the map information 19 included in the screen category 704 of the map screen was displayed before the screen information during telephone communication is displayed.

In Phase 1, the notification restriction determination part 58 monitors whether or not the mail information has been acquired (Step S001).

[Phase 2]

When receiving the mail information from the portable terminal device 200, the navigation apparatus 100 changes the screen from Phase 1 to Phase 2. In the case of the "during display of the map screen" 911, the "telephone communication state of the navigation apparatus" 801 of the status information 800 is "standby", and the "screen category of the navigation apparatus" 801 of the status information 800 is "map screen". In other words, in the mail reception notification restriction information 600, the "standby" and the "map screen" are the telephone communication state and the screen category, in which the display of the pop-up dialog is permitted (No in Step S003, No in Step S005).

Therefore, the notification restriction determination part 58 superimposes and displays on the map screen a pop-up dialog 901 including an "Yes" icon and a "No" icon for receiving an instruction of whether or not to read out the electronic mail text together with a predetermined message such as "E-mail has been received" (Step S007). Further, when the "Yes" icon or the No icon is pressed, a screen example of Phase 3 appears.

On the other hand, in the case of the "during display of the telephone communication screen" 912, the "telephone communication state of the navigation apparatus" 801 of the status information 800 is "during telephone communication", which corresponds to the telephone communication state defining the wait of the display of the pop-up dialog in the mail reception notification restriction information 600 (Yes in Step S003).

Therefore, the notification restriction determination part 58 does not proceed to the process for performing the display of the pop-up dialog (repeats Step S003 and Step S004). In other words, the notification restriction determination part 58 executes the wait of the display of the pop-up dialog. In addition, the display control part 52 continues to display the screen information (screen during telephone communication) as it is.

Further, when the "telephone communication state of the navigation apparatus" 801 and the "screen category of the navigation apparatus" 802 become those that permit the display of the pop-up dialog, the screen example of Phase 3 is displayed on the display (Step S007).

Specifically, when the telephone communication of the portable terminal device 200 (or of the navigation apparatus 100) is finished, the status 804 of the status information 800 is changed from the "during telephone communication" to the "standby". In this case, the screen indicating during telephone communication displayed on the display 17 is returned to the map information 19 that was displayed before that. In other words, the "screen category of the navigation apparatus" 802 of the status information 800 is changed to the "map screen". In this way, when the telephone communication is finished, the display of the pop-up dialog is permitted in both the "telephone communication state of the navigation apparatus" 801 and the "screen category of the navigation apparatus" 802 (No in Step S003, No in Step S005). Therefore, the display control part 52 executes control to display the pop-up dialog for notifying that electronic mail has been received (Step S007).

[Phase 3]

In the case of the "during display of the map screen" 911, when the "Yes" icon is pressed in Phase 2 (Yes in Step S008), the display control part 52 displays a screen example 903 showing the e-mail text on the display 17. On the other hand, when the "No" icon is pressed (No in Step S008), the display control part 52 deletes the display of the pop-up dialog 901 (Step S010) and displays the screen before the pop-up dialog 901 is displayed, namely the map screen.

In the case of the "during display of the telephone communication screen" 912, a pop-up dialog 902 including an "Yes" icon and a No icon for receiving an instruction of whether or not to read out the electronic mail text is displayed on the map screen together with a message such as "E-mail has been received" (Step S007). Further, transition from Phase 3 to Phase 4 is the same as that in the case of the "during display of the map screen" 911, and hence description thereof is omitted.

Further, in Phase 2 of the "during display of the telephone communication screen" 912, even in the case where the user displays the map screen on the display 17 while maintaining the telephone communication state by a predetermined operation, the pop-up dialog 902 for notifying that electronic mail has been received is not displayed. This is because, when the map screen is displayed, the "screen category of the navigation apparatus" 802 of the status information 800 is changed to the "map screen", but the "telephone communication state of the navigation apparatus" 801 remains to correspond to the "during telephone communication".

Figure 11:
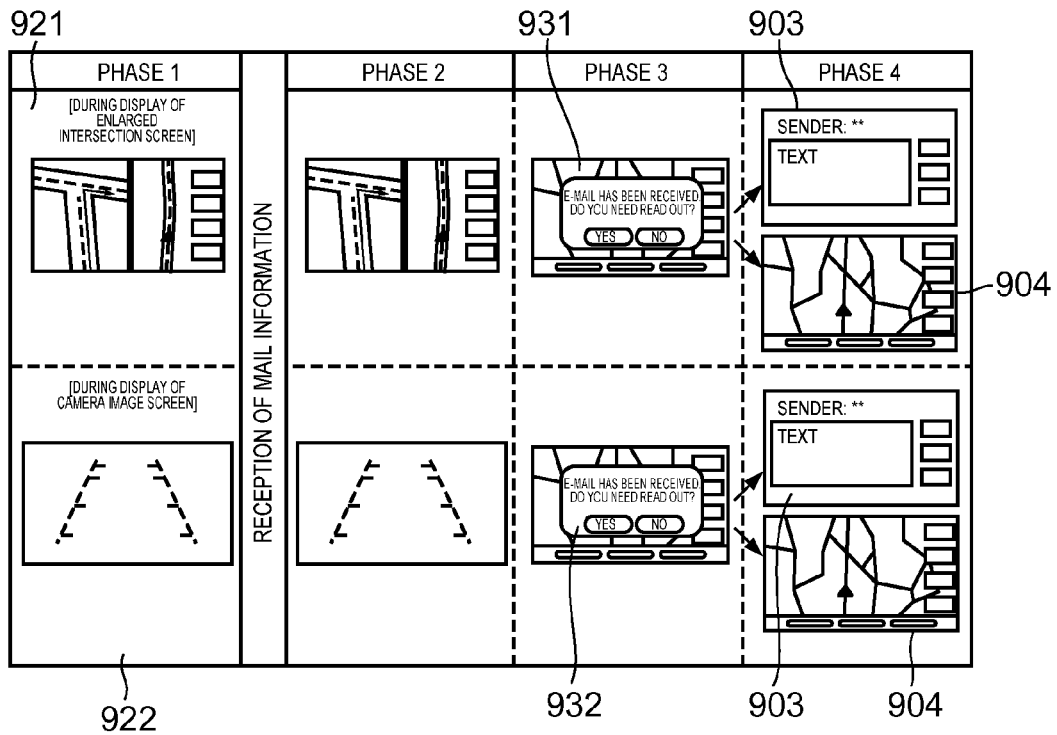
FIG. 11 is a diagram illustrating a screen example according to an embodiment of the present invention.

FIG. 11 is a diagram illustrating another example of screen transition of the navigation apparatus 100 when the mail reception notification process is executed. FIG. 11 is a diagram illustrating a screen transition of "during display of the enlarged intersection screen" 921 and "during display of the camera image screen" 922, which are displayed after the display of the pop-up dialog is temporarily caused to wait, on the time series when the portable terminal device 200 has received electronic mail. Further, it is supposed that, during display of any of the screens, the telephone communication state of the portable terminal device 200 is "standby" in the screen transition.

[Phase 1]

In the "during display of the enlarged intersection screen" 921, the screen of the enlarged intersection is displayed on the display 17 of the navigation apparatus 100. In addition, in the "during display of the camera image screen" 922, the camera image screen taken by the in-vehicle camera (for example, an in-vehicle camera mounted to a position capable of taking a rear view image of the vehicle) is displayed. Further, it is supposed that, for example, the map information 19 included in the screen category 704 of the map screen was displayed before the enlarged intersection screen and the camera image screen are displayed.

In Phase 1, the notification restriction determination part 58 monitors whether or not the mail information has been acquired (Step S001).

[Phase 2]

When receiving the mail information from the portable terminal device 200, the navigation apparatus 100 changes the screen from Phase 1 to Phase 2. In the case of the "during display of the enlarged intersection screen" 921, the "screen category of the navigation apparatus" 802 of the status information 800 is the "enlarged intersection screen", which corresponds to the screen category defining the wait of the display of the pop-up dialog in the mail reception notification restriction information 600 (Yes in Step S005).

In addition, in the case of the "during display of the camera image screen" 922, the "screen category of the navigation apparatus" 802 of the status information 800 is the "camera image screen", and hence corresponds to the screen category defining the wait of the display of the pop-up dialog (Yes in Step S005).

In other words, each of the both screen information in the display belongs to the screen category defining the wait of the display of the pop-up dialog, and hence does not proceed to the process for performing the display of the dialog (repeats Steps S003, S005, and S006). In other words, the notification restriction determination part 58 executes the wait of the display of the pop-up dialog.

Further, when the "telephone communication state of the navigation apparatus" 801 and the "screen category of the navigation apparatus" 802 become those that permit the display of the pop-up dialog in the mail reception notification restriction information 600, the screen example of Phase 3 is displayed on the display 17.

Specifically, in the "during display of the enlarged intersection screen" 921, when the vehicle runs a predetermined distance (for example, 5 m) after the vehicle passes the intersection, the map screen that was displayed before the display of the enlarged intersection screen is displayed on the display 17. In this case, a status 805 indicating the "screen category of the navigation apparatus" 802 of the status information 800 is changed from the "enlarged intersection screen" to the "map screen". In this way, after the vehicle passes the intersection, the "telephone communication state of the navigation apparatus" 801 ("standby") and the "screen category of the navigation apparatus" 802 are those, in which the display of the pop-up dialog is permitted in the mail reception notification restriction information 600 (No in Step S003, No in Step S005). Therefore, the display control part 52 executes control to superimpose and display a pop-up dialog 931 for notifying that electronic mail has been received on the screen information (Step S007).

In addition, in the case of the "during display of the camera image screen" 922, when a gear position of the vehicle is changed from rear (R) to another gear position such as drive (D), for example, the map screen that was displayed before the display of the camera image screen is displayed on the display 17. In this case, the "screen category of the navigation apparatus" 802 of the status information 800 is changed from the "camera image screen" to the "map screen". In this way, when the gear position is changed, both the "telephone communication state of the navigation apparatus" 801 ("standby") and the "screen category of the navigation apparatus" 802 become those, in which the display of the pop-up dialog is permitted in the mail reception notification restriction information 600 (No in Step S003, No in Step S005). Therefore, the display control part 52 executes control to superimpose and display a pop-up dialog 932 for notifying that electronic mail has been received on the screen information (Step S007).

Further, Phase 3 and Phase 4 are the same as Phase 3 and Phase 4 of the "during display of the telephone communication screen" 912, and hence description thereof is omitted.

As described above, according to the navigation apparatus 100 of this embodiment, it is possible to notify at more appropriate timing that electronic mail has been received. In particular, when the portable terminal device 200 is in a predetermined telephone communication state such as during telephone communication, or when the navigation apparatus 100 displays screen information such as the enlarged intersection screen or the camera image screen, it is considered that priority for the user to know that the electronic mail has been received is low. Therefore, the navigation apparatus 100 of this embodiment notifies the user that electronic mail has been received after waiting for becoming an appropriate situation for the user to know that electronic mail has been received.

In particular, the case of during telephone communication to/from the portable terminal device 200 is considered to be used in more urgent situation than e-mail. In addition, it is considered that the in-vehicle speaker 300 may be occupied by the hands-free function to cause situations that the message notifying that electronic mail has been received cannot be read out, or that it becomes hard to hear telephone communication when the message is read out. Therefore, in this case, the reception notification of electronic mail is caused to wait, and after the telephone communication or the like is finished, the reception notification is performed so that the notification can be performed at an appropriate timing.

In addition, when the user intends to turn at the intersection, the priority to know that electronic mail has been received is lower than the priority to know the direction to turn at the intersection. In addition, it is conceivable to display the screen information for notifying the user of the direction to travel at the intersection and the screen information for notifying the user that electronic mail has been received simultaneously side by side. However, because a space of display on the display 17 is limited, there is a problem in that the display becomes difficult for the user to see. Further, the enlarged intersection screen appears and disappears along with movement of the vehicle, and in order to display the screen for notifying the user that electronic mail has been received together with the enlarged intersection screen, various pieces of screen information are displayed in short period of time, which may provide the user with complicated impression. Therefore, in this embodiment, during the display of the enlarged intersection screen, the pop-up dialog for notifying that electronic mail has been received is not displayed. At a timing after the vehicle passes the intersection so that the display of the enlarged intersection screen becomes unnecessary, the pop-up dialog is displayed. Thus, it is possible to notify the user at an appropriate timing that electronic mail has been received.

In addition, when the camera image screen is displayed, there is considered, for example, a case where parking operation such as parking the vehicle into the garage is performed while viewing the camera image screen. In this case, it is considered that the priority of displaying the camera image screen is higher than the priority of displaying the information for notifying that e-mail has been received. In addition, it is conceivable to display the camera image screen and the screen information for notifying the user that electronic mail has been received simultaneously side by side. However, because a space of display on the display 17 is limited, there is a problem in that the display becomes difficult for the user to see. Therefore, in this embodiment, during the display of the camera image screen, the pop-up dialog for notifying that electronic mail has been received is not displayed. At a timing when the display of the camera image screen becomes unnecessary, the pop-up dialog is displayed. Thus, it is possible to notify the user at an appropriate timing that electronic mail has been received.

In addition, instead of simply omitting the notification that electronic mail has been received, the notification is performed afterward when a situation with higher priority is finished. Therefore, it is possible to prevent a situation that the user does not notice arrival of electronic mail. In addition, for example, the user can know that electronic mail has been received when a driving load is relatively small, and can perform the operation for instructing to readout the electronic mail. In addition, only by a simple operation, the text of the received electronic mail is read out so that convenience for the user can be improved.

The first embodiment of the present invention has been described.

Further, in the embodiment described above, the display of the pop-up dialog for notifying that electronic mail has been received is caused to wait in the case where the screen category of the navigation apparatus 100 belongs to the "camera image screen" 922, the "enlarged intersection screen" 921, or the "telephone communication screen" 912. However, the present invention is not limited to this case. For instance, it is possible to execute the wait of the display of the dialog when a "VICS information screen" or a "voice recognition receiving screen" is displayed when electronic mail has been received. It is because these display screens are also considered to have higher priority than the reception notification of electronic mail.

In addition, for example, it is possible to execute the wait of the display of the dialog when predetermined screen information displayed together with voice guidance (for example, a branch or a junction of a motorway) is displayed. It is because the screen information displayed together with voice guidance usually displays a place, at which careful driving is required, and this display screen is also considered to have higher priority than the reception notification of electronic mail.

Further, the "VICS information screen" is a screen category of the screen displaying VICS information received by the beacon reception device 32. In addition, the voice recognition is a voice recognition function that is realized by a predetermined voice analysis process based on voice information of the user acquired from the microphone 21 of the navigation apparatus 100, and the "voice recognition receiving screen" is a screen category of a screen displayed when the voice recognition function is executed.

In addition, in the embodiment described above, it is supposed that the telephone communication is performed using the microphone 21 of the navigation apparatus 100 by using the hands-free function. However, when the portable terminal device 200 and the navigation apparatus 100 are connected to each other in a communicable manner via Bluetooth, it is possible to adopt the telephone communication using the microphone 206 of the portable terminal device 200. Also in this case, the navigation apparatus 100 can acquire a status indicating the telephone communication state from the portable terminal device 200, and hence the status information 800 can be updated.

In addition, the navigation apparatus 100 itself may have the telephone communication function.

In this case, the general control part 51 detects the telephone communication state of the navigation apparatus 100. Then, the status management part 57 acquires the status indicating the telephone communication state from the general control part 51 at predetermined timing (for example, every 0.1 seconds) so as to update the status information 800. Similarly to the embodiment described above, the notification restriction determination part 58 determines whether or not to notify that electronic mail has been received by using the status information 800 and the mail reception notification restriction information 600.

In this case, for example, even when the portable terminal device 200 receives electronic mail when emergency telephone is used by the telephone communication function of the navigation apparatus 100, the display of the pop-up dialog for notifying the reception and output of the voice information to be output from the in-vehicle speaker 300 together with the display of the pop-up dialog can be waited. When the emergency telephone is used, it is considered that urgency and priority are very high. Therefore, it is possible to prevent the reception notification of electronic mail from being performed in this situation.

In addition, in the embodiment described above, the display of the dialog is deleted when the icon for receiving the instruction of read out of the e-mail text (the "Yes" icon or the "No" icon) is pressed. However, it is possible to delete the display of the dialog after a predetermined period of time (for example, 20 seconds) elapses from the display. Specifically, when the instruction concerning the read out of e-mail text is not received even after 20 seconds has elapsed from the display of the pop-up dialog, the general control part 51 deletes the display of the dialog.

In this way, it is possible to eliminate the user's effort to press the "No" icon when the user does not want read out of the text, and it is possible to provide information in accordance with a situation where the user is placed.

In addition, in the embodiment described above, the navigation apparatus 100 performs wireless communication via Bluetooth with the portable terminal device 200, but the present invention is not limited to this. For instance, the navigation apparatus 100 is possible to perform wired communication to/from the portable terminal device 200 with a universal serial bus (USB) cable or the like.

In addition, in the embodiment described above, the mail reception notification restriction information 600 defines both the telephone communication state as well as the screen category, in which the display of the pop-up dialog is permitted, and the telephone communication state as well as the screen category, in which the display of the dialog is caused to wait, but the present invention is not limited to this. For instance, the mail reception notification restriction information 600 is possible to define only one of the telephone communication state as well as the screen category, in which the display of the pop-up dialog is permitted, and the telephone communication state and the screen category, in which the display of the dialog is caused to wait. By defining only one of them, it is possible to improve development efficiency compared with the case where both of them are defined.

In addition, in the embodiment described above, the small window pop-up dialog is superimposed and displayed on the map screen or the like in order to notify the user that the electronic mail has been received, but the present invention is not limited to this. For instance, it is possible to display the screen information indicating that electronic mail has been received instead of the screen information such as the map screen.

In addition, in the embodiment described above, the voice information generation part 59 outputs the generated voice information to the in-vehicle speaker 300. However, instead of this or in addition to this, the voice information generation part 59 may output the generated voice information to the speaker 22.

In addition, in the embodiment described above, the present invention is applied to the navigation apparatus 100 having the so-called navigation function. However, it is possible to apply the present invention to a smart phone, a display car audio, or other information display apparatus without the navigation function. In addition, in the embodiment described above, the present invention is applied to the navigation apparatus 100 including the display 17 as an example of the display apparatus. Instead, however, it is possible to apply the present invention to an information output device configured to output a signal to a separate display apparatus.

Further, the present invention is not limited to the embodiment and variations described above, and includes various other embodiments and variations. For instance, the embodiment is described above in detail for describing the present invention in an easily understood manner, and the present invention is not necessarily limited to one including all the described configurations. In addition, apart of the configuration of a certain embodiment can be replaced by a part of the configuration of another embodiment or variation. It is also possible to add a configuration of a certain embodiment to a configuration of another embodiment. In addition, concerning apart of the configuration of each embodiment, it is possible to add, eliminate, or replace with another configuration.

In addition, a part or a whole of each configuration, function, process part, and process means may be realized by a program for a processor to realize each function. Information such as programs, tables, and files for realizing each function can be stored in a storage device such as a memory, a hard disk, or a solid state drive (SSD), or in a recording medium such as an IC card, a secure digital (SD) memory card, or a digital versatile disk (DVD). Further, control lines and information lines that are considered to be necessary for description are illustrated, and all the control lines and information lines needed for products are not necessarily illustrated.

What is claimed is:

1. An information display apparatus, comprising:
   an information display part, which displays various information;
   a communication part, which performs one of wireless communication and wired communication to or from a portable terminal device, wherein the information display part:
   stores information pertaining to display priorities that are assigned to different items including different telephone communication states and different screen categories of a navigation apparatus;
   displays a first screen that notifies a user that electronic mail has been received when the portable terminal device has received the electronic mail; and
   continues to display a second screen that notifies a user of at least a given screen category of the navigation apparatus when the portable terminal device has received the electronic mail while the second screen is displayed,
   an operation reception part, which receives a user's operation;
   a voice information generation part, which generates voice information from text of the electronic mail received by the portable terminal device; and a voice output part, which outputs to a speaker the voice information generated by the voice information generation part when the operation reception part receives a predetermined operation, wherein some telephone communication states and some screen categories of the navigation apparatus are assigned a higher display priority than a display priority of the first screen, such that when the electronic mail is received, while the display is displaying the second screen associated with a higher display priority item, the display continues to display the second screen until after display of the second screen is finished, at which point the display begins to display the first screen, some telephone communication states and some screen categories of the navigation apparatus are assigned a lower display priority than the display priority of the first screen, such that when the electronic mail is received, while the display is displaying the second screen associated with a lower display priority item, the display immediately stops displaying the second screen and is switched to the first screen, such that whether display of the second screen information is changed or maintained depends on the telephone communication state or the given screen category of the navigation apparatus, the display of the first screen is prevented until after a hands-free telephone communication is completed, and on the first screen, a read out instruction of the text of the electronic mail is received from the user.

2. An information display apparatus according to claim 1, wherein the communication part is capable of performing voice communication to or from an external device via the portable terminal device, and wherein the second screen indicates information about the voice communication.

3. An information display apparatus according to claim 1, further comprising an image reception part, which receives an image signal of an image around a vehicle, wherein the second screen indicates information about the image around the vehicle.

4. An information display apparatus according to claim 1, further comprising:

a destination specifying part, which specifies a destination;

a route specifying part, which specifies a recommended route to the destination specified by the destination specifying part; and a guide determination part, which determines whether or not a current position requires guidance based on the recommended route specified by the route specifying part, wherein the information display part displays guide screen information based on the recommended route specified by the route specifying part when the current position requires the guidance, and wherein the second screen comprises the guide screen information.

5. An information display apparatus according to claim 1, wherein, when a predetermined period elapses from display of the screen information for notifying the user that the electronic mail has been received, the display of the screen information is finished.

6. An information display apparatus according to claim 1, wherein telephone communication states of an incoming call, an outgoing call, and a call on hold are assigned the higher display priority and a telephone communication state of standby is assigned the lower display priority, and screen categories of the navigation apparatus including a camera image screen, a telephone communication, and an enlarged intersection screen are assigned the higher display priority and screen categories of the navigation apparatus including a map screen, an audio screen, and a menu screen are assigned the lower display priority.

7. An information display apparatus according to claim 1, wherein when the electronic email is received, while the second screen depicts an upcoming enlarged street intersection, display of the second screen is maintained.

8. An information display method, comprising:

displaying various information;

performing one of wireless communication and wired communication to or from a portable terminal device;

storing information pertaining to display priorities that are assigned to different items including different telephone communication states and different screen categories of a navigation apparatus;

displaying a first screen that notifies a user that electronic mail has been received when the portable terminal device has received the electronic mail;

continuing to display a second screen that notifies a user of at least a given screen category of the navigation apparatus when the portable terminal device has received the electronic mail while the second screen is displayed;

assigning a higher display priority to some telephone communication states and some screen categories of the navigation apparatus than a display priority of the first screen, such that when the electronic mail is received, while the display is displaying the second screen associated with a higher display priority item, the display continues to display the second screen until after display of the second screen is finished, at which point the display begins to display the first screen;

assigning a lower display priority to some telephone communication states and some screen categories of the navigation apparatus than the display priority of the first screen, such that when the electronic mail is received, while the display is displaying the second screen associated with a lower display priority item, the display immediately stops displaying the second screen and is switched to the first screen, such that whether display of the second screen information is changed or maintained depends on the telephone communication state or the given screen category of the navigation apparatus, receiving a user's operation;

generating voice information from text of the electronic mail received by the portable terminal device; and outputting to a speaker the generated voice information when receiving a predetermined operation, wherein the display of the first screen is prevented until after a hands-free telephone communication is completed, and on the first screen, a read out instruction of the text of the electronic mail is received from the user.

9. An information display method according to claim 8, further comprising performing voice communication to or from an external device via the portable terminal device, wherein the second screen indicates information about the voice communication.

10. An information display method according to claim 8, further comprising receiving an image signal of an image around a vehicle,
   wherein the second screen indicates information about the image around the vehicle.

11. An information display method according to claim 8, further comprising:
   specifying a destination;
   specifying a recommended route to the specified destination;
   determining whether or not a current position requires guidance based on the specified recommended route; and
   displaying guide screen information based on the specified recommended route when the current position requires the guidance,
   wherein the second screen includes the guide screen information.

12. An information display method according to claim 8, further comprising finishing the display of the screen information when a predetermined period elapses from display of the screen information for notifying the user that the electronic mail has been received.

13. An information display method according to claim 8, wherein telephone communication states of an incoming call, an outgoing call, and a call on hold are assigned the higher display priority and a telephone communication state of standby is assigned the lower display priority, and
   screen categories of the navigation apparatus including a camera image screen, a telephone communication, and an enlarged intersection screen are assigned the higher display priority and screen categories of the navigation apparatus including a map screen, an audio screen, and a menu screen are assigned the lower display priority.

14. An information display method according to claim 8, wherein when the electronic email is received while the second screen depicts an upcoming enlarged street intersection display of the second screen is maintained.

* * * * *